United States Patent [19]

Izumi

[11] Patent Number: 5,333,701
[45] Date of Patent: Aug. 2, 1994

[54] INSTRUMENT PANEL FOR INDUSTRIAL VEHICLE

[75] Inventor: Akira Izumi, Kariya, Japan

[73] Assignee: Kabushiki Kaisha Toyoda Jidoshokki Seisakusho, Kariya, Japan

[21] Appl. No.: 992,457

[22] Filed: Dec. 17, 1992

[30] Foreign Application Priority Data

Dec. 27, 1991 [JP] Japan .................................. 3-360147

[51] Int. Cl.$^5$ ............................................. B60K 37/00
[52] U.S. Cl. ...................................... 180/90; 180/90.6
[58] Field of Search ..................... 180/89.12, 90, 90.6; 296/70, 72, 192, 194, 203

[56] References Cited

U.S. PATENT DOCUMENTS

| | | | |
|---|---|---|---|
| 1,728,306 | 9/1929 | Richardson | 180/90.6 |
| 2,823,557 | 2/1958 | Lenning | 180/90.6 |
| 2,843,419 | 7/1958 | Wilfert | 296/39.3 |
| 3,949,892 | 4/1976 | Ohms | 60/413 |
| 4,126,202 | 11/1978 | Hern | 180/90 |
| 4,447,860 | 5/1984 | Stone et al. | 180/90 |
| 4,634,735 | 1/1987 | Thiersault et al. | 296/70 |

FOREIGN PATENT DOCUMENTS

| | | |
|---|---|---|
| 012940 | 12/1979 | European Pat. Off. . |
| 0012940 | 7/1980 | European Pat. Off. . |
| 124093 | 11/1984 | European Pat. Off. . |
| 374975 | 6/1990 | European Pat. Off. . |
| 56-017726 | 4/1981 | Japan . |
| 58-128968 | 10/1983 | Japan . |
| 58-174042 | 10/1983 | Japan .................................. 296/70 |
| 62-116316 | 10/1987 | Japan . |
| 1-134525 | 9/1989 | Japan . |

OTHER PUBLICATIONS

English Abstract–Japanese Patent 56017726 Feb. 1981.
English Abstract–Japanese Patent 62116316 Oct. 1987.
English Abstract–Japanese Patent 58128968 Aug. 1983.
Search Report of European Application 92161886 Apr. 1993.

*Primary Examiner*—Eric Culbreth
*Attorney, Agent, or Firm*—Brooks Haidt Haffner & Delahunty

[57] ABSTRACT

The present invention provides an instrument panel suitable for use on an industrial vehicle such as a forklift truck and excellent in noise insulating characteristics, switch configuration characteristics, safety and maintenance facility. The instrument panel is disposed in front of a driver's seat, made of a synthetic resin and arranged to have a switch portion with a variety of switches and a cylinder cover for covering a portion of a tilt cylinder with protrusively facing the driver's seat. A noise insulating seal member is interposed between the lower end surface of the instrument panel and the toe board.

16 Claims, 5 Drawing Sheets

INSTRUMENT PANEL FOR INDUSTRIAL VEHICLE

BACKGROUND OF THE INVENTION

1. Field of the Invention

The present invention relates to an instrument panel suitable for use in an industrial vehicle and excellent in noise insulating characteristics, switch configuration characteristics, safety and maintenance facility.

2. Related Art Statement

Hitherto, an instrument panel 9 for an industrial vehicle such as a fork-lift truck has been disposed in front of a driver's seat and formed into a complicated shape as shown in FIG. 6. In general, the instrument panel 9 has a steering shaft fitting portion 90 at a substantially central portion thereof for the purpose of disposing a steering wheel (omitted from illustration). Furthermore, the instrument panel 9 has cargo lever fitting portions 92, 93 and 94 on the two sides thereof for the purpose of disposing cargo levers (omitted from illustration) for operating a lift or the like. In addition, the instrument panel 9 has switch portions 95 and 96 on which a variety of switches are mounted. The instrument panel 9 thus arranged is formed into a predetermined shape by molding a metal plate.

In particular, the instrument panel 9 must be designed conspicuously and attractively because it is disposed in front of the driver's seat. Furthermore, there has been an eager desire that the instrument panel 9 be able to minimize noise generated by the aforesaid devices disposed on the instrument panel 9 or noise generated by the engine disposed in the front portion of the vehicle (and below the hood), hydraulic noise and vibrations. In addition, there has been a desire that the weight and the cost of the manufactured instrument panel 9 be reduced while realizing an excellent manufacturing yield.

However, the aforesaid conventional technology encounters the following problems: the fact that the instrument panel 9 is manufactured by molding a metal plate as shown in FIG. 7 causes a problem to arise in that the noise generated by, for example, the engine disposed in the front portion of the vehicle (and below the hood) and leaked through gaps formed on a toe board 3 for connecting pedals thereto or disposing pedals thereon cannot be isolated. Furthermore, it is not sometimes preferable to directly dispose switches on the instrument panel 9 because the instrument panel 9 cannot satisfactorily isolate vibrations. In addition, cylinder covers 91 for covering a pair of right and left tilt cylinders 4, which can be respectively tilted, must be, for safety, disposed below the instrument panel 9. Furthermore, the cylinder covers 91, which cover the tilt cylinders 4, must completely be removed at the time of repair and inspection of the tilt cylinders 4 and their piping portions which must sometimes be performed. Hence, a problem rises in that the maintenance cannot easily be performed with the conventional instrument panel 9.

SUMMARY OF THE INVENTION

Accordingly, an object of the present invention is to provide an instrument panel for an industrial vehicle and which instrument panel is excellent in the noise insulating characteristics, the switch configuration characteristics, safety and the maintenance facility.

The instrument panel for an industrial vehicle according to the present invention is disposed in front of a driver's seat of the industrial vehicle, made of a synthetic resin, having a switch portion in which switches are disposed, and cylinder covers for covering a portion of a tilt cylinder with protrusively facing the driver's seat in such a manner that a noise insulating seal member is interposed between the lower end surface of the instrument panel and a toe board.

The most critical aspect of the present invention resides in that the instrument panel is made of a synthetic resin and includes the switch portion and the cylinder covers in such a manner that the noise insulating seal member is interposed between the lower end surface of the instrument panel and the toe board.

As the synthetic resin, a fiber reinforced plastic (FRP) or plastic made of polypropylene resin may be employed. As a result, the instrument panel according to the present invention reveals excellent durability.

The instrument panel according to the present invention may be divided into a plurality of sections (for example, may be divided-vertically), or may be integrally formed.

It is preferable to arrange the switch portion in a flat portion at the top end portion of the instrument panel. In this case, the switch configuration characteristics can be improved and therefore attractiveness can be improved. The aforesaid noise insulating seal member is made of, for example, a hollow elastic member made of, for example, rubber and the like.

The cylinder covers are formed while forming no gap from the toe board in such a manner that they are disposed, for example, at the two lower end portions of the instrument panel to protrusively expand toward the driver's seat. It is preferable that an opening/closing cap, which can be opened/closed, be provided for each of the cylinder covers.

Since the instrument panel according to the present invention is made of a synthetic resin, the instrument panel can be formed into a complicated shape while revealing excellent design characteristics. Furthermore, the weight can be reduced, vibrations can be prevented, noise can be insulated and the instrument panel can easily be fastened. Since the noise insulating seal member is interposed between the lower end surface of the instrument panel and the toe board, noise generated by the engine or the like can effectively be insulated. The fact that the switch portion is arranged in the flat portion at the top end portion of the instrument panel will enable switches to be fastened attractively. In addition, the cylinder cover for the tilt cylinder is integrally formed on the instrument panel without formation of any gap between the cylinder cover and the toe board and, as the result of which, the safety can be improved. In the case where the instrument panel is composed of a plurality of pieces, the instrument panel can easily be attached/detached, fastened and interchanged. In the case where the opening/closing cap is provided on the cylinder cover, the maintenance can easily be performed. Therefore, according to the present invention, there is provided an instrument panel for an industrial vehicle excellent in the noise insulating characteristics, switch configuration characteristics, safety and maintenance facility.

DESCRIPTION OF THE PREFERRED EMBODIMENTS

Figure 1:
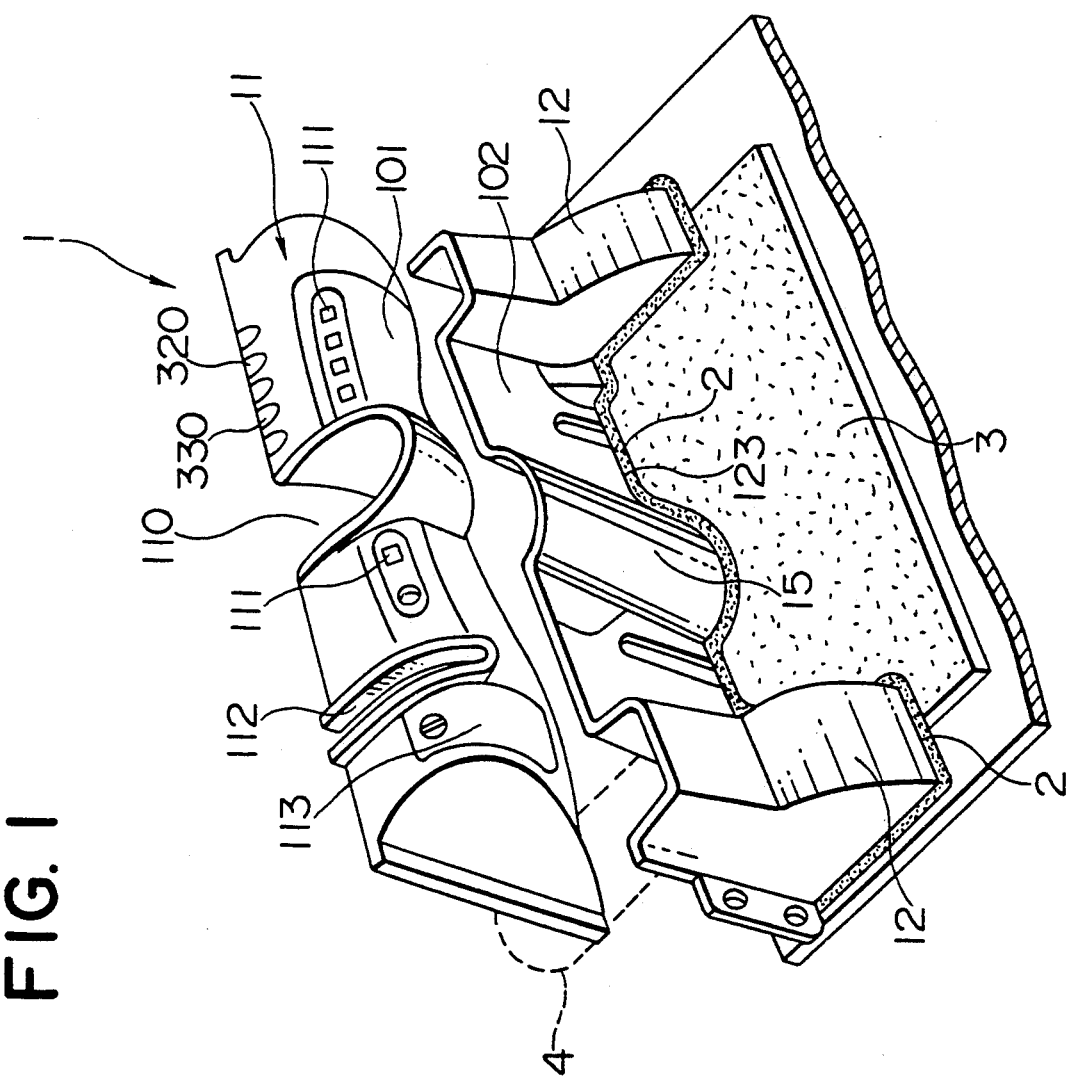
FIG. 1 is a developed perspective view which illustrates a first embodiment of an instrument panel for an industrial vehicle according to the present invention.
Figure 2:
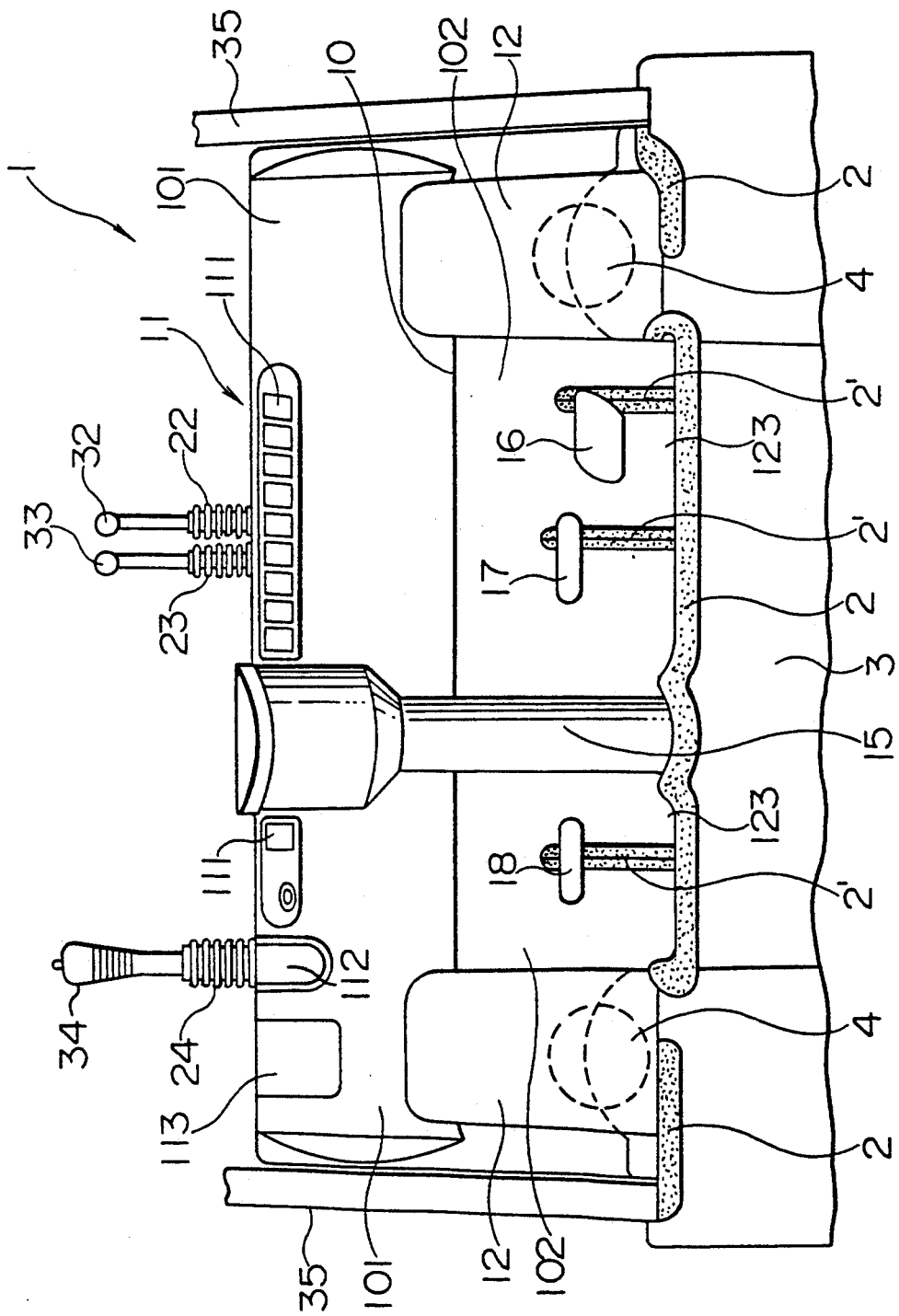
FIG. 2 is a front elevational view which illustrates the instrument panel as shown in FIG. 1.
Figure 3:
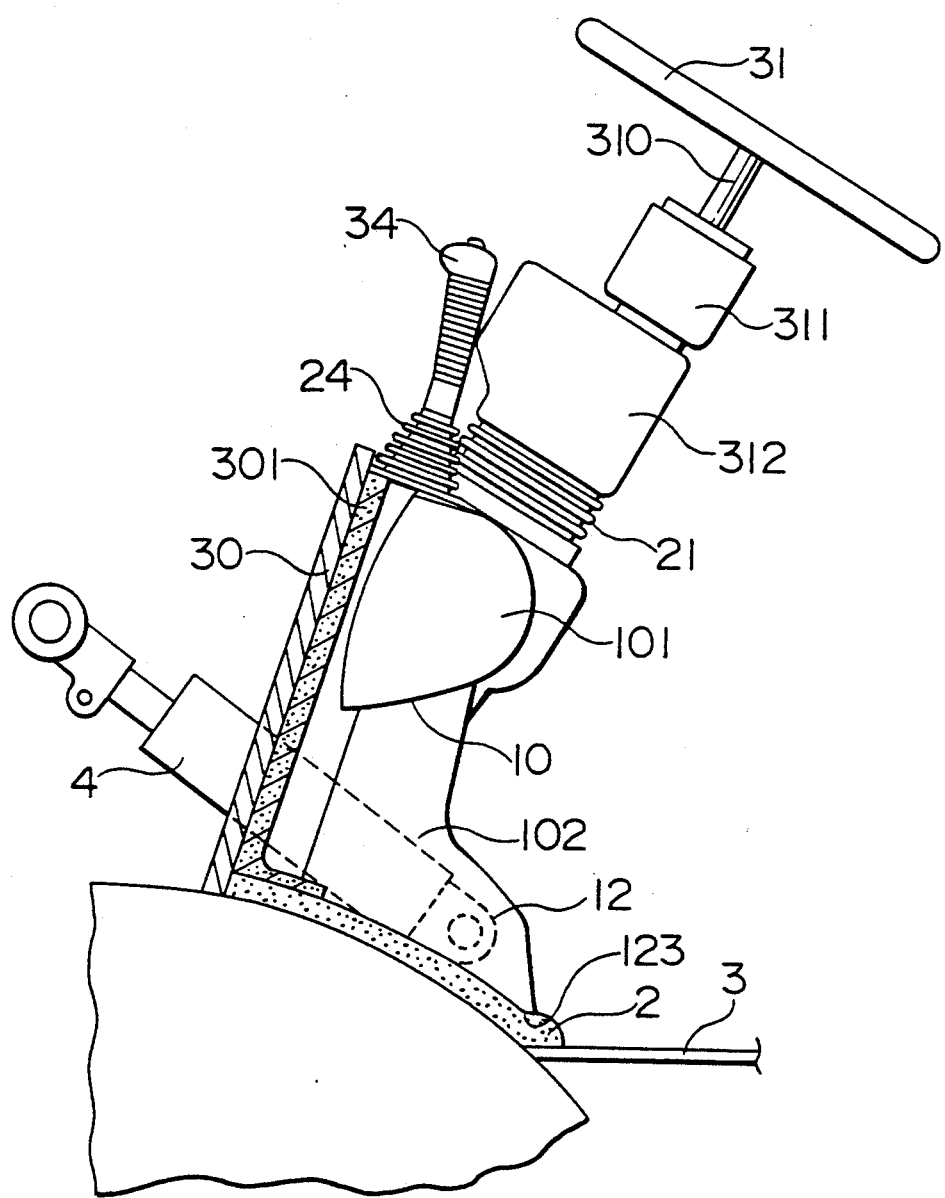
FIG. 3 is a side elevational view which illustrates the instrument panel as shown in FIG. 1.

FIGS. 1 to 3 illustrate a first embodiment of an instrument panel 1 for an industrial vehicle according to the present invention. In particular, the instrument panel 1 according to this embodiment is to be disposed in front of the driver's seat of the industrial vehicle such as a fork-lift truck.

As shown in FIGS. 1 and 2, the instrument panel 1 is made of a synthetic resin and comprising a switch portion 11, in which various switches are arranged, and cylinder covers 12 each for covering the portion of the tilt cylinder 4 with protrusively facing the driver's seat. In particular, a noise insulating seal member 2 is, as illustrated, interposed between a lower end surface 123 of the instrument panel 1 and a toe board 3.

As the aforesaid synthetic resin for making the instrument panel 1, a molded plastic member which uses fiber reinforced plastic (FRP) is employed. The molded plastic member is used to integrally form the instrument panel 1 having a complicated shape. As shown in FIGS. 1 to 3, the instrument panel 1 is formed into a two-sectioned member composed of an upper instrument panel 101 and a lower instrument panel 102 which has the lower end surface 123 and the cylinder covers 12.

The upper instrument panel 101 has, at a substantially central portion thereof, a shaft fitting portion 110 within which a steering shaft 310 of a steering wheel 31 is positioned. Furthermore, meter panels 311 and 312 are disposed below the steering wheel 31 as shown in FIG. 3. In addition, switch portions 11 are disposed on the two sides of the shaft fitting portion 110 of the steering wheel 31. Since switch boxes 111 are, in a horizontal direction, concentrically arranged in the switch portion 111 as shown in FIGS. 1 and 2, an advantage in terms of design can be obtained because a variety switches can easily and attractively be arranged. Furthermore, a rubber boot 21 is fastened in the vicinity of the base portion of the steering shaft 310 in the steering shaft fitting portion 110 of the steering wheel 31 as shown in FIG. 3.

In the aforesaid upper instrument panel 101, cargo lever fitting portions 320 and 330, within which cargo levers 32 and 33 for operating the tilt cylinder 4 or the like are positioned, are formed above the switch portion 11, more particularly, on the right of the shaft fitting portion 110 for the steering wheel 31. In the portion adjacent to the shaft fitting portion 110, more particularly, in a portion on the left of the shaft fitting portion 110, a brake fitting portion 112, within which a parking brake 34 is disposed, is formed as shown in FIG. 2. Furthermore, a reservoir tank cover 113 is disposed adjacent to the brake fitting portion 112. In the cargo lever fitting portions 320 and 330, a bellows-type rubber boots 22 and 23 are formed in the vicinity of the base portions of the cargo levers 32 and 33 as shown in FIG. 2. Also in the vicinity of the base portion of the parking brake 34 in the brake fitting portion 112, a bellows-type rubber boot 24 is fastened.

The instrument panel 1 is disposed in the front portion of the industrial vehicle and arranged between a pair of right and left pillars 35 in such a manner that the lower instrument panel 102 is disposed below the upper instrument panel 101.

The lower instrument panel 102 has, in a substantially central portion thereof, a steering shaft portion 15 through which the steering shaft 310 extends as shown in FIGS. 1 to 3. Furthermore, a variety of elongated through holes respectively serving as an accelerator pedal fitting portion 16, a clutch pedal fitting portion 17, and a brake pedal fitting portion 18 are formed on the two sides of the steering shaft portion 15. In addition, a pair of cylinder covers 12 are disposed on the two sides of the lower instrument panel 102. The cylinder covers 12 have stream-line expansion or projection portions expanding or projecting toward the driver's seat as shown in FIGS. 1 and 2. The tilt cylinders 4 are disposed in front of the cylinder covers 12.

It should be noted that the noise insulating seal member 2 is disposed between the lower end surface of the lower instrument panel 102 and the toe board 3. The noise insulating seal member 2 is made of a hollow rubber member revealing excellent noise insulating characteristics and having satisfactory durability and elasticity. In addition, a noise insulating seal 2' similar to the noise insulating seal member 2 is fastened around each periphery of the elongated holes serving as the accelerator pedal fitting portion 16, the clutch pedal fitting portion 17 and the brake pedal fitting portion 18, so that the noise insulating characteristics are further improved.

The upper instrument panel 101 and the lower instrument panel 102 thus configured are connected to each other at a joint portion 10 by bolts and spring nuts (omitted from illustration) as shown in FIGS. 2 and 3. As a result, the two instrument panels 101 and 102 are integrally jointed together. Furthermore, a protector 30 formed by applying a sound absorbing material 301 to a metal plate is fastened in front of the upper instrument panel 101 and the lower instrument panel 102. The residual portions are arranged to be similar to the conventional instrument panel.

Since the instrument panel 1 according to the first embodiment of the present invention is made of the synthetic resin, the instrument panel 1 can be formed into a complicated shape while revealing excellent design characteristics. Furthermore, the instrument panel 1 according to the present invention will enable effects to be obtained in that the weight can be reduced, vibration and noise can be satisfactorily eliminated, and it can be fastened easily, while revealing an advantage that it can be manufactured easily. In addition, switches can be disposed as desired and attractively because the switch boxes 111 are horizontally and collectively arranged in order on the two sides of the shaft fitting portion 110 of the steering wheel 31. Hence, an advantage in terms of design attractiveness can be obtained.

The fact that the noise insulating seal member 2 is interposed between the lower end surface 123 of the instrument panel 1 and the toe board 3 leads to a fact that the noise generated from the engine or the like can be insulated. The noise insulating characteristics and the attractiveness can be further improved because the rubber boots 21 to 24 are fastened in the vicinity of the base portion of each of the steering shaft 310, the cargo levers 32 and 33 and the parking brake 34. Furthermore, the cylinder cover 12, which covers the portion of the tilt cylinder 4 with a portion protruding in the direction of the driver's seat, is formed to project over the toe board 3 while leaving no gap between the cylinder cover 12 and the toe board 3, so that a foot of the driver cannot be undesirably inserted between the cylinder cover 12 and the toe board 3. As a result, the safety can be improved satisfactorily. In addition, the instrument panel 1 according to this embodiment can be attached/detached easily, causing effects to be obtained in that the same can be easily fastened and interchanged because the instrument panel 1 is formed into a separation type composed of the upper instrument panel 101 and the lower instrument panel 102.

Although the first embodiment is arranged in such a manner that the instrument panel 1 is formed into a separation type composed of the upper portion and the lower portion, they may be integrally formed into a one-piece member.

Figure 4:
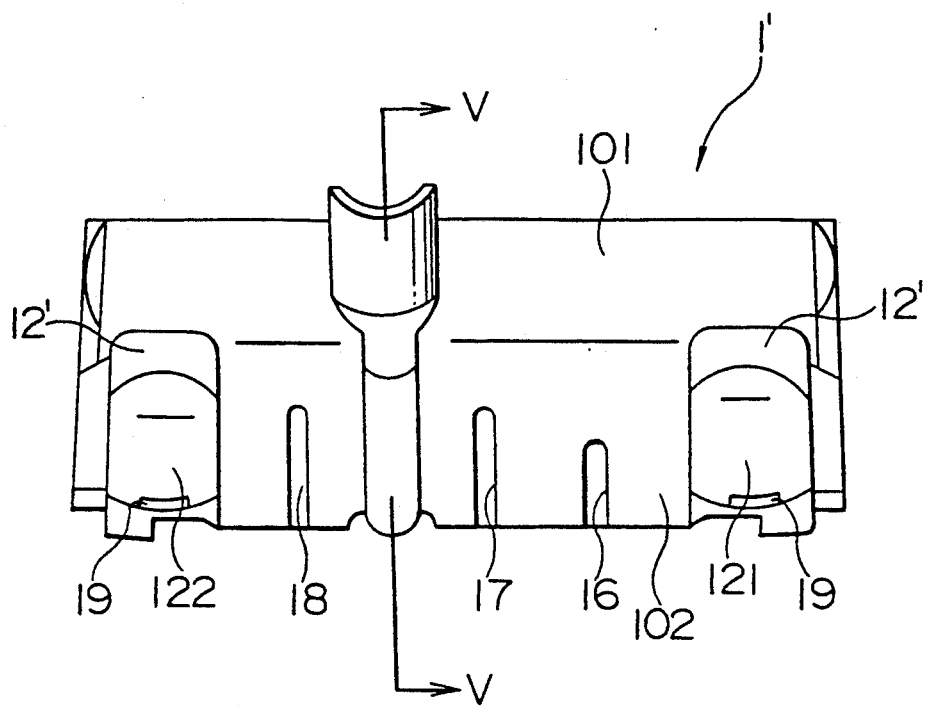
FIG. 4 is a front elevational view which illustrates a second embodiment of an instrument panel for an industrial vehicle according to the present invention.
Figure 5:
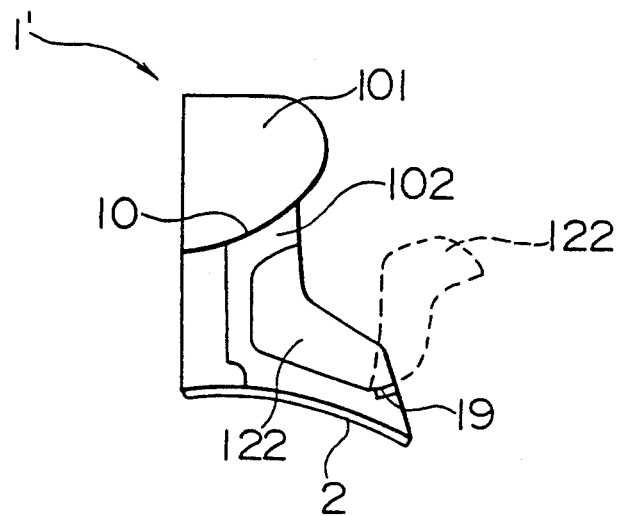
FIG. 5 is a side elevational cross sectional view of the instrument panel taken along line V—V of FIG. 4.
Figure 6:
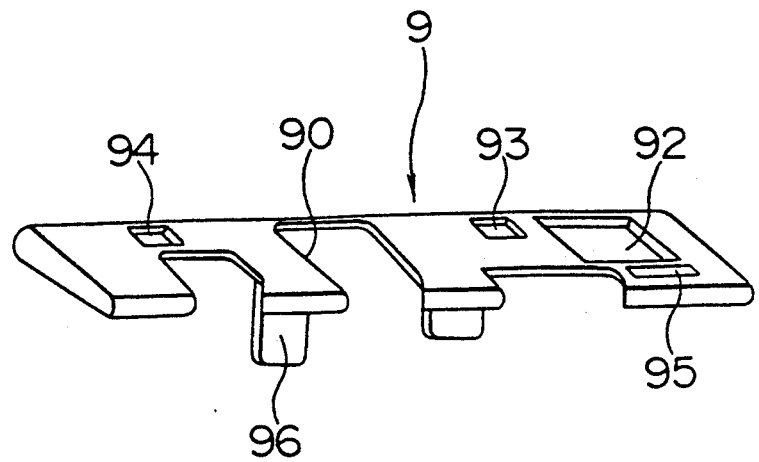
FIG. 6 is a perspective view which illustrates a conventional instrument panel for an industrial vehicle.
Figure 7:
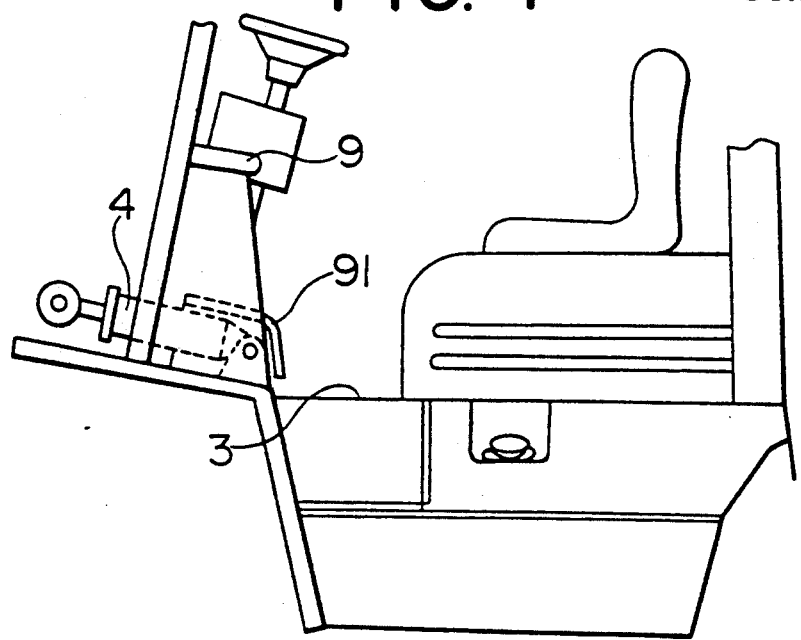
FIG. 7 is a side elevational view which illustrates the instrument panel as shown in FIG. 6.

FIGS. 4 and 5 illustrate an instrument panel 1' according to a second embodiment of the present invention. The difference from the instrument panel 1 according to the first embodiment lies in that opening/closing caps (i.e., access caps) 121 and 122 for maintenance are disposed to open/close (provide access to) the projecting portions of cylinder covers 12'. The residual arrangements are the same as those according to the first embodiment.

As shown in FIG. 4, the opening/closing caps 121 and 122 are opened/closed at the time of repairing and/or inspecting the tilt cylinder 4 (see FIG. 3) and its piping portion to be performed in the right and the left cylinder covers 12'. Each of the opening/closing caps 121 and 122 is disposed in such a manner that a substantially elongated hole is formed in a portion of each cylinder cover 12' and an integral hinge 19 is fastened to enable the bottom portion of the elongated hole to be opened/closed. The integral hinge 19 has, in a portion thereof, a bending-enabled portion formed into a V-groove.

When the tilt cylinders 4 and their piping portions are repaired and/or inspected, the aforesaid opening/closing caps 121 and 122 are opened, but the same are closed in an ordinary state.

The instrument panel 1' according to the second embodiment reveals excellent safety and noise insulating characteristics. Furthermore, the tilt cylinder 4 can be repaired conveniently, causing an effect to be obtained in that excellent maintenance characteristics can be realized. Therefore, the instrument panel 1' according to the second embodiment enables excellent maintenance facility to be obtained in that the repair and/or inspection can easily be performed as compared with the instrument panel 1 according to the aforesaid first embodiment, while obtaining similar effects to those obtainable from the first embodiment.

I claim:

1. An instrument panel for a fork-lift truck which truck has a driver's seat in front of which is: a toe board, left and right side pillars, and right and left actuating cylinders for tilting a mast assembly; said cylinders being mounted above said toe board respectively adjacent said left and right side pillars; said instrument panel being mountable between said pillars in front of the driver's seat extending upwardly from a lower end which is adjacent said toe board, said instrument panel comprising:
   a switch portion which is formed integral with said instrument panel and in which switches are arranged;
   a respective cylinder cover formed integral with said instrument panel for covering at least a portion of each of said actuating cylinders that faces said driver's seat;
   a noise insulating seal member for disposition at said lower end of said instrument panel for engaging said toe board to establish a seal therebetween; and
   a rigid protecting panel for mounting at the rear of said instrument panel as viewed from said driver's seat and extending between said pillars.

2. An instrument panel according to claim 1 further comprising:
   a steering shaft accommodating portion for a steering shaft of a steering wheel, said steering shaft portion being formed in a substantially central portion of said instrument panel;
   switch boxes horizontally arrayed in a line in said switch portion on the two sides of said steering shaft;
   a cargo lever accommodating portion for a cargo lever, said cargo lever portion being disposed adjacent said switch portion for the purpose of operating said tilt cylinders;
   a brake lever accommodating portion for a parking brake lever, said brake lever portion being disposed adjacent said steering shaft portion; and
   bellows-shape rubber boots for fastening respectively to the base portion of each of said steering shaft, said cargo lever and said parking brake lever.

3. An instrument panel according to claim 2, wherein said instrument panel is formed in two pieces composed of an upper instrument panel and a lower instrument panel;
   said upper instrument panel has said steering shaft portion, said switch portion, said cargo lever portion and said parking brake lever portion; and
   said lower instrument panel has said tilt cylinder covers disposed adjacent its two sides, a steering shaft portion which is disposed in a substantially central portion thereof and through which said steering shaft extends, and an accelerator pedal accommodating portion, a clutch pedal accommodating portion and a brake pedal accommodating portion, each of the last three portions being formed with an elongated through hole of which some are disposed on one side and the remainder on the other side of said steering shaft portion.

4. An instrument panel according to claim 3, wherein a noise insulating seal member is fastened to each of the portions surrounding said elongated through holes respectively serving as said accelerator pedal accommodating portion, said clutch pedal accommodating portion and said brake pedal accommodating portion.

5. An instrument panel according to claim 3, wherein said rigid protecting panel comprises a noise absorbing member joined to a metal plate.

6. An instrument panel according to claim 1, wherein said cylinder cover has a portion projecting toward said driver's seat and has an access cap which can be opened and closed, said access cap being disposed in said projecting portion of said cylinder cover to provide access to said tilt cylinder.

7. An instrument panel according to claim 1, wherein said instrument panel is made of a synthetic resin.

8. An instrument panel according to claim 1, wherein said noise insulating seal member comprises a hollow rubber material.

9. An instrument panel according to claim 7 wherein said synthetic resin is selected from a group including fiber reinforced plastic (FRP) and a polypropylene resin.

10. An instrument panel for an industrial vehicle for location in front of a driver's seat where it extends upwardly from a lower end adjacent a toe board, said instrument panel comprising:
  a switch portion which is formed integral with said instrument panel and in which switches are arranged;
  a cylinder cover formed integral with said instrument panel to cover at least a portion of a tilt cylinder which faces said driver's seat; and
  a noise insulating seal member for sealing the space between said lower end of said instrument panel and said toe board, said instrument panel being made of a synthetic resin selected from the group including fiber reinforced plastic (FRP) and a polypropylene resin.

11. An instrument panel according to claim 10 further comprising:
  a steering shaft accommodating portion for a steering shaft of a steering wheel, said steering shaft portion being formed in a substantially central portion of said instrument panel;
  switch boxes horizontally arrayed in a line in said switch portion on the two sides of said steering shaft;
  a cargo lever accommodating portion for a cargo lever, said cargo lever portion being disposed adjacent said switch portion for the purpose of operating said tilt cylinders;
  a brake lever accommodating portion for a parking brake lever, said brake lever portion being disposed adjacent said steering shaft portion; and bellows-shape rubber boots for fastening respectively to the base portion of each of said steering shaft, said cargo lever and said parking brake lever.

12. An instrument panel according to claim 11, wherein said instrument panel is formed in two pieces composed of an upper instrument panel and a lower instrument panel;
  said upper instrument panel has said steering shaft portion, said switch portion, said cargo lever portion and said parking brake lever portion; and
  said lower instrument panel has said tilt cylinder covers disposed adjacent its two sides, a steering shaft portion which is disposed in a substantially central portion thereof and through which said steering shaft extends, and an accelerator pedal accommodating portion, a clutch pedal accommodating portion and a brake pedal accommodating portion each of the last three portions being formed with an elongated through hole of which some are disposed on one side and the remainder on the other side of said steering shaft portion.

13. An instrument panel according to claim 12, wherein a noise insulating seal member is fastened to each of the portions surrounding said elongated through holes respectively serving as said accelerator pedal accommodating portion, said clutch pedal accommodating portion and said brake pedal accommodating portion.

14. An instrument panel according to claim 12, wherein said rigid protecting panel comprises a noise absorbing member joined to a metal plate.

15. An instrument panel according to claim 10, wherein said cylinder cover has a portion projecting toward said driver's seat and has an access cap which can be opened and closed, said access cap being disposed in said projecting portion of said cylinder cover to provide access to said tilt cylinder.

16. An instrument panel disposed in front of a driver's seat of a fork-lift truck extending upwardly from a lower end adjacent a toe board, said instrument panel comprising:
  a steering shaft accommodating portion for a steering wheel shaft, said steering shaft portion being formed in a substantially central portion of said instrument panel;
  switch boxes horizontally arrayed in a line on the two sides of said steering shaft portion;
  cylinder covers for covering tiltable cylinders at the lower portions of the two side ends of said instrument panel, said cylinder covers protruding toward said driver's seat and extending toward said toe board with substantially no gap therebetween;
  access caps which can be opened and closed and which are respectively provided for said cylinder covers to provide access to said tiltable cylinders;
  a cargo lever accommodating portion for a cargo lever, said cargo lever portion being disposed adjacent said switch boxes for the purpose of operating said tiltable cylinders;
  a brake lever accommodating portion disposed adjacent said steering shaft portion for the purpose of receiving a parking brake lever;
  bellows-shape rubber boots respectively fastened to the base portion of each of said steering shaft, said cargo lever and said parking brake lever;
  a noise insulating seal member interposed between said lower end of said instrument panel and said toe board; and
  a noise insulating seal member fastened to each of the portions surrounding elongated through openings in the lower portion of said instrument panel serving as an accelerator pedal accommodating portion, a clutch pedal accommodating portion and a brake pedal accommodating portion.

* * * * *